(12) United States Patent
Zogg et al.

(10) Patent No.: US 7,388,540 B1
(45) Date of Patent: Jun. 17, 2008

(54) AD HOC LARGE SCALE DIRECTIONAL NETWORKS

(75) Inventors: Scott J. F. Zogg, Cedar Rapids, IA (US); Kenneth M. Peterson, Marion, IA (US); Michael N. Newhouse, Cedar Rapids, IA (US); Daniel M. Zange, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 779 days.

(21) Appl. No.: 10/853,605

(22) Filed: May 25, 2004

(51) Int. Cl.
*H04Q 1/00* (2006.01)
*H04B 7/00* (2006.01)

(52) U.S. Cl. .......................... 342/370; 342/367
(58) Field of Classification Search ............... 342/367, 342/370
See application file for complete search history.

(56) References Cited

U.S. PATENT DOCUMENTS

| 6,642,887 B2 | 11/2003 | Owechko | 342/371 |
| 2003/0100343 A1 | 5/2003 | Zourntos et al. | 455/562 |
| 2004/0043795 A1 | 3/2004 | Zancewicz | 455/562.1 |

OTHER PUBLICATIONS

M.C. Vanderveen et al., Joint angle and delay estimation (JADE) for signals in multipath environments, Conference Record of the Thirtieth Asilomar Conference on Signals, Systems and Computers, vol. 2, p. 1250-1254, Nov. 1996.*
I.-T. Lu et al., A novel "channel diversity" approach, IEEE Vehicular Technology Conference, vol. 2, p. 1646-1649, May 1998.*
Y. Ogawa et al., An adaptive antenna for a multipath propagation envirionment, IEEE International Conference on Communications, vol. 3, p. 1345-1349, Jun. 1998.*
A. Boukalov et al., New cellular wireless system concept for very high bit rate data transmission with smart antennas at the mobile and base station, IEEE Radio and Wireless Conference, p. 17-23, Sep. 2000.*
M. Sanchez et al., CSMA/CA with Beam Foaming Antennas in Multi-hop Packet Radio, Swedish Workshop on Wireless Ad-hoc Networks, Mar. 2001.*
E. Ulukan et al., Angular MAC protocol for wireless ad hoc networks with smart antennas Proceedings of the IEEE 12th Signal Processing and Communications Applications Conference, p. 696-699, Apr. 2004.*

(Continued)

*Primary Examiner*—Thomas H. Tarcza
*Assistant Examiner*—Fred H. Mull
(74) *Attorney, Agent, or Firm*—Nathan O. Jensen; Kyle Eppele

(57) ABSTRACT

A method for transmitting data from a transmitter to a receiver in an ad hoc large scale directional network includes the followings steps. A first training sequence is sent by a transmitter in an ad hoc directional network. The first training sequence is received by a receiver in the ad hoc directional network. The receiver determines a first apparent direction from which the first training sequence is sent. The receiver sends a second training sequence to the transmitter. The transmitter determines a second apparent direction from which the second training sequence is sent. The transmitter directs a signal with the first training sequence to the receiver. The transmitter sends the signal with the first training sequence to the receiver. The receiver receives the first training sequence. The receiver is directed to the first apparent direction to receive the signal.

12 Claims, 5 Drawing Sheets

OTHER PUBLICATIONS

English translation of Ulukan.*

*Asympotic Capacity Bounds for Ad-hoc Networks Revisited: The Directional and Smart Antenna Cases* by Akis Spyropoulos and Cauligi s. Raghavendra; Electrical Engineering—Systems, University of Southern California, Los Angeles, CA; {spyro, raghu}@halcyon.usc.edu; 5 pages.

*Mobile Ad Hoc Networking for the Transformed Army (MANTA)* by Robert C. Durst and Kevin H. Grace; Mitre Technology Program; © 2003, The MITRE Corporation; durst@mitre.org and kgrace@mitre.org; 9 pages.

*Mobile Ad Hoc Networking for the Transformed Army (MANTA)* by Robert C. Durst and Kevin H. Grace; Mitre Technology Program; © 2002, The MITRE Corporation; durst@mitre.org and kgrace@mitre.org; 9 pages.

*Topology Control for Ad hoc Networks with Directional Antennas* by Zhuochuan Huang, et al.; Cepartment of computer and Information Sciences, University of Delaware, Newark, DE 19716; 6 pages.

*Research Tools for 3-D Mobile Ad-hoc Networking with Directional Antenna* by Bo Ryu, et al.; Network Analysis and Systems Department, HRL Laboratories, LLC, 3011 Malibu Canyon Rd., Malibu, CA 90265; {ryu, cellotim, mohin, telbatt, arpeters}@wins.hrl.com; © 2002 HRL Laboratories, LLC; 5 pages.

*A Primer on Digital Beamforming* by Toby Haynes; Spectrum Signal Processing; Mar. 26, 1998; 15 pages.

*FCS Communications Technology for the Objective Force* by Paul Sass, MITRE Corporation and Jim Freebersyser, Defense Advanced Research Projects Agency (DARPA); 20 pages.

*Smart Antenna System Analysis, Integration and Performance for Mobile Ad-Hoc Networks (MANETs)* by Salvatore Bellofiore, et al.; IEEE Transactions on Antennas and Propagation, vol. 50, No. 5, May 2002; © 2002 IEEE; pp. 571-581.

*A MAC protocol based on Adaptive Beamforming for Ad Hoc Networks* by Harkirat Singh and Suresh Singh; Department of Computer Sciences, Portland State University; harkirat@cs.pdx.edu; 5 pages.

* cited by examiner

AD HOC LARGE SCALE DIRECTIONAL NETWORKS

FIELD OF THE INVENTION

This invention relates generally to signal acquisition and processing, and particularly to ad hoc large scale directional networks.

BACKGROUND OF THE INVENTION

An ad hoc network is a self-configuring network of mobile nodes connected by wireless links—the union of which form an arbitrary topology. The nodes are free to move randomly and organize themselves arbitrarily; thus, the network's wireless topology may change rapidly and unpredictably. Ad hoc networks comprise mobile nodes that communicate via multihop wireless channels, which are usually deployed in unattended environments. The ability to construct and operate an ad hoc network without the need of any wired infrastructure (e.g., base stations, routers, and the like) makes ad hoc networks a promising candidate for military, disaster relief, and law enforcement applications.

There has been a rapidly growing interest in the use of directional antennas in ad hoc networks. Such antennas have the ability to concentrate radiated power towards the intended direction of transmission or reception, thereby reducing the amount of radiated power necessary to reach a node. As a result, the energy efficiency of ad hoc network protocols may be greatly improved. For example, in military applications, directional networking provides important capabilities that may afford the warfighter better communications facilities in specific operational scenarios. These capabilities may include improved data rates, reduced observability, greater spectral reuse, and better immunity to intentional and unintentional interference. Directional networking has emerged as a key technology for realizing the next generation Anti-Jam (AJ), low probability of intercept/low probability of detection (LPI/LPD), and bandwidth efficient communication systems suitable for ad hoc network applications. Directional networking may be critical to enabling network-centric applications for the Future Combat System (FCS) and Warfighter Information Network—Tactical (WIN-T).

To realize an efficient ad hoc directional communication system that is able to provide the aforementioned benefits, the conventional approach is based on directional protocols that point steerable directional antennas such as phased array antennas (PAA) and the like. This conventional approach has been the focus of most near-term efforts including, for example, FCS and Networked Data Link (NDL).

Using the conventional approach, however, directional networks are frequently limited in size and often require additional information on node locations due to the difficulty of locating and tracking network nodes through a narrow aperture.

Thus, it would be desirable to provide an ad hoc large scale directional network, in which a node may receive data from one or more nodes without a priori knowledge of the transmitter direction.

SUMMARY OF THE INVENTION

The present invention is directed to ad hoc large scale directional networks. The present invention provides a novel system using adaptive beamforming and robust synchronization sequences for formation of large ad hoc directional networks. The present invention further discloses a scalable digital beamforming architecture, which utilizes multiple omni-directional antenna elements that digitally form beams to receive data from one or more network nodes or participants without a priori knowledge of the transmitter direction.

In an exemplary aspect of the present invention, a method for transmitting data from a transmitter to a receiver in an ad hoc large scale directional network includes the followings steps. A first training sequence is sent by a transmitter in an ad hoc directional network. A training sequence is a synchronization sequence. Each node in the ad hoc directional network may have a unique training sequence. If detectability or frequency reuse is a concern, the first training sequence may be an omni-directional training sequence of a reduced power (e.g., 10 dB lower than a normal transmission, or the like). Alternatively, if required by LPI/LPD considerations, the first training sequence may be sent in a short series of reduced power sectored transmissions (e.g., 10 dB lower than a normal transmission, or the like) until a desired receiver is located. The first training sequence is received by a receiver in the ad hoc directional network. The receiver determines a first apparent direction from which the first training sequence is sent. The receiver sends out a second training sequence to the transmitter. The second training sequence may be unique to the receiver. The transmitter determines a second apparent direction from which the second training sequence is sent. The transmitter directs a signal with the first training sequence to the receiver. Preferably, the first training sequence precedes the signal (or data) during the data transmission. The transmitter sends the signal with the first training sequence to the receiver. The receiver receives the first training sequence. The receiver is directed to the first apparent direction to receive the signal.

According to an additional exemplary aspect of the present invention, a scalable digital beamforming architecture for performing adaptive beamforming to receive data from a node of an ad hoc large scale directional network may include an array processing unit, and a plurality of sub-array processing units which are controlled by the array processing unit. Each of the plurality of sub-array processing units may control a plurality of digital transmit/receive paths. Each of the plurality of digital transmit/receive paths may include an antenna element, a receiver, and an element processing unit. The element processing unit may be physically located inside the associated receiver. The antenna element may be omni-directional. The receiver is communicatively coupled to the antenna element and the element processing unit. The element processing unit may include a correlator.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention provides a novel system using adaptive beamforming and robust synchronization sequences for formation of large ad hoc directional networks. The present invention further discloses a scalable digital beamforming architecture, which utilizes multiple omni-directional antenna elements that digitally form beams to receive data from one or more network nodes or participants without a priori knowledge of the transmitter direction.

The present invention may provide a number of significant advantages over the conventional directional networking approach. These advantages may include (1) simplified network management; (2) increased system bandwidth; (3) ad hoc operation for a much larger number of nodes or users; and (4) greatly improved performance in a multipath fading environment.

Figure 1:
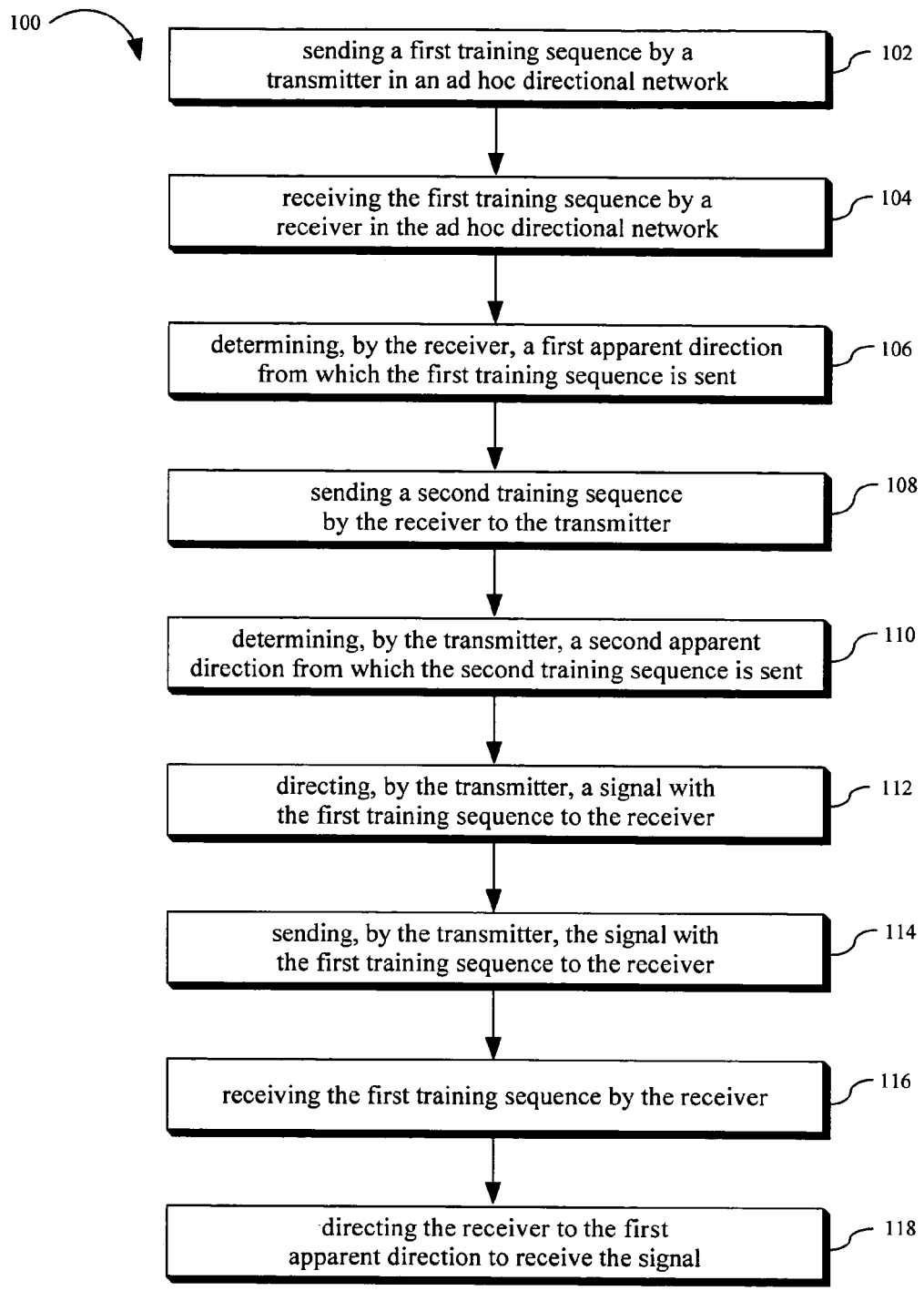
FIG. 1 is a flowchart of a method for transmitting data from a transmitter to a receiver in an ad hoc large scale directional network in accordance with an exemplary embodiment of the present invention.

Referring now to FIG. 1, a flowchart of a method or process 100 for transmitting data from a transmitter to a receiver in an ad hoc large scale directional network in accordance with an exemplary embodiment of the present invention is shown. The transmitter and receiver are located on different nodes or participants in the ad hoc large scale directional network. The method 100 may allow the ad hoc directional network to operate without additional information on the participant location and without tracking individual participants. The process 100 may start with a step 102 in which a first training sequence is sent by a transmitter in an ad hoc directional network. A training sequence is a synchronization sequence. Each node in the ad hoc directional network may have a unique training sequence. For example, the first training sequence may be unique to the transmitter. If detectability or frequency reuse is a concern, the first training sequence may be a reduced power omni-directional training sequence (e.g., 10 dB lower than a normal transmission, or the like). Alternatively, if required by LPI/LPD considerations, the first training sequence may be sent in a short series of reduced power sectored transmissions (e.g., 10 dB lower than a normal transmission, or the like) until a desired receiver is located. The first training sequence is received by a receiver in the ad hoc directional network 104. The receiver determines a first apparent direction from which the first training sequence is sent 106. The receiver sends out a second training sequence to the transmitter 108. The second training sequence may be unique to the receiver. Preferably, the second training sequence is a directional training sequence. The transmitter determines a second apparent direction from which the second training sequence is sent 110. The transmitter directs a signal with the first training sequence to the receiver 112. Preferably, the first training sequence precedes the signal (or data) during the data transmission. The transmitter sends the signal with the first training sequence to the receiver 114. The receiver receives the first training sequence 116. The receiver is directed to the first apparent direction to receive the signal 118.

Figure 2:
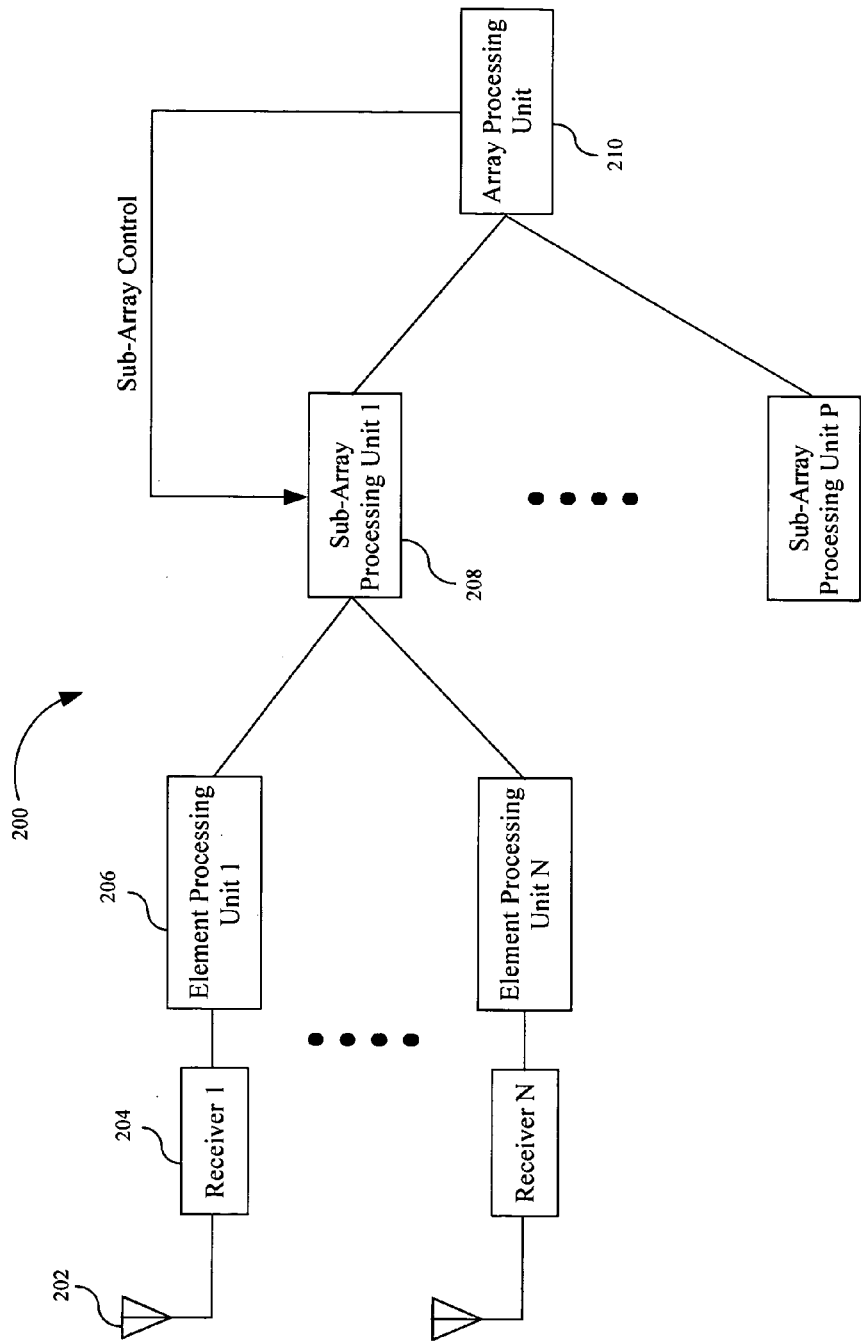
FIG. 2 is a schematic block diagram illustrating a scalable digital beamforming architecture including an element processing unit, a sub-array processing unit, and an array processing unit in accordance with an exemplary embodiment of the present invention.
Figure 3:
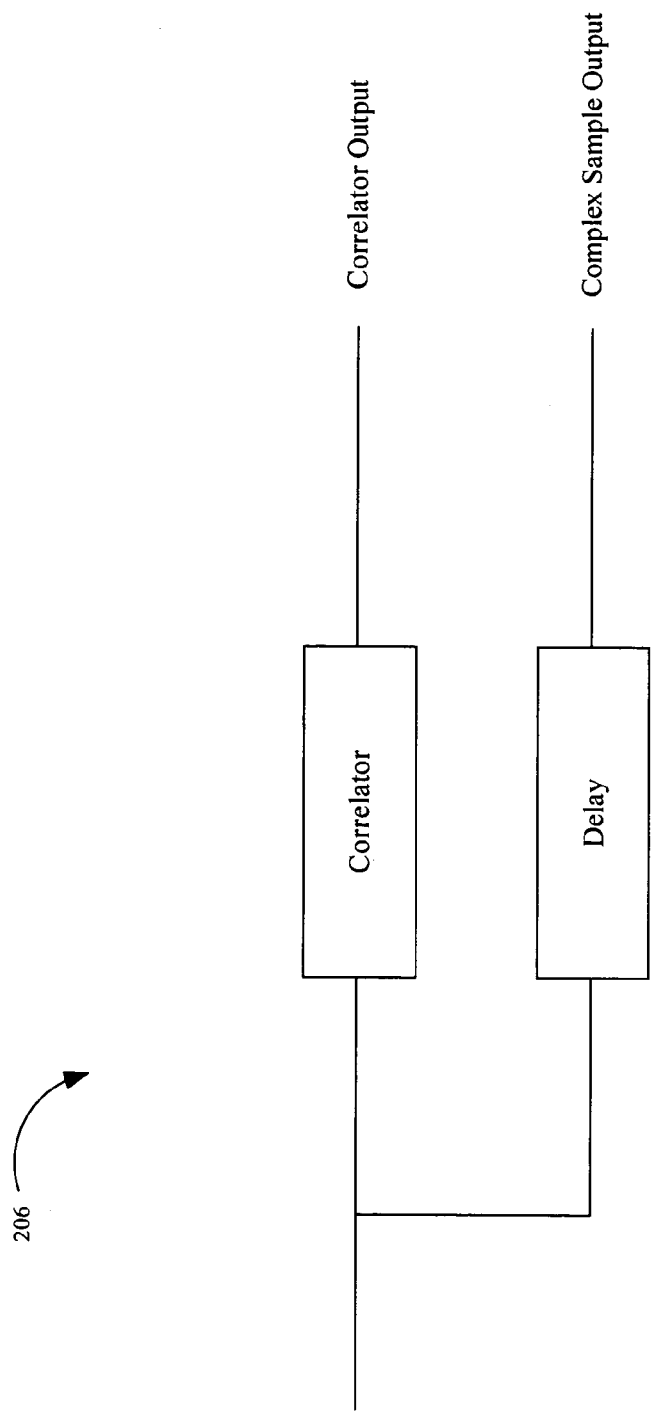
FIG. 3 is a schematic block diagram illustrating the element processing unit shown in FIG. 2 in accordance with an exemplary embodiment of the present invention.
Figure 4:
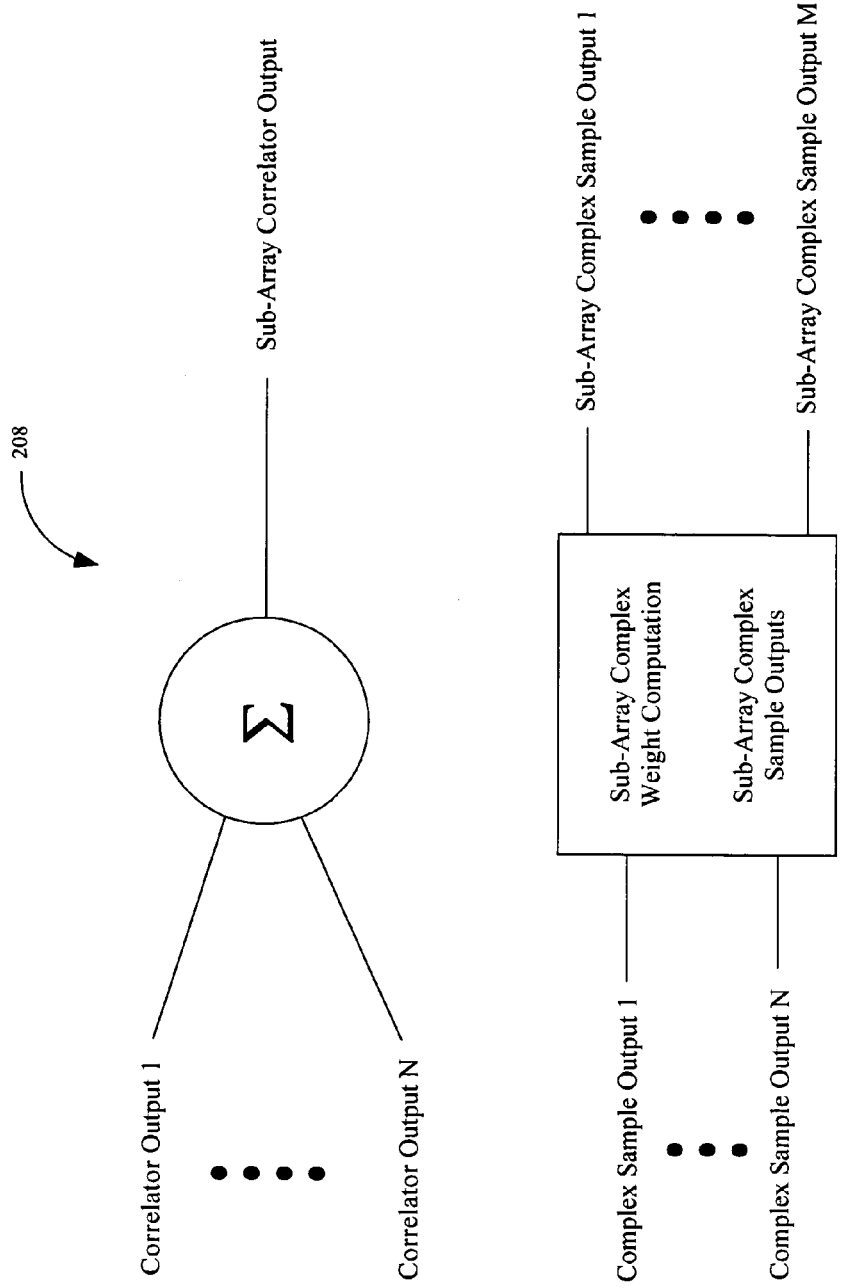
FIG. 4 is a schematic diagram illustrating the sub-array processing unit shown in FIG. 2 in accordance with an exemplary embodiment of the present invention.
Figure 5:
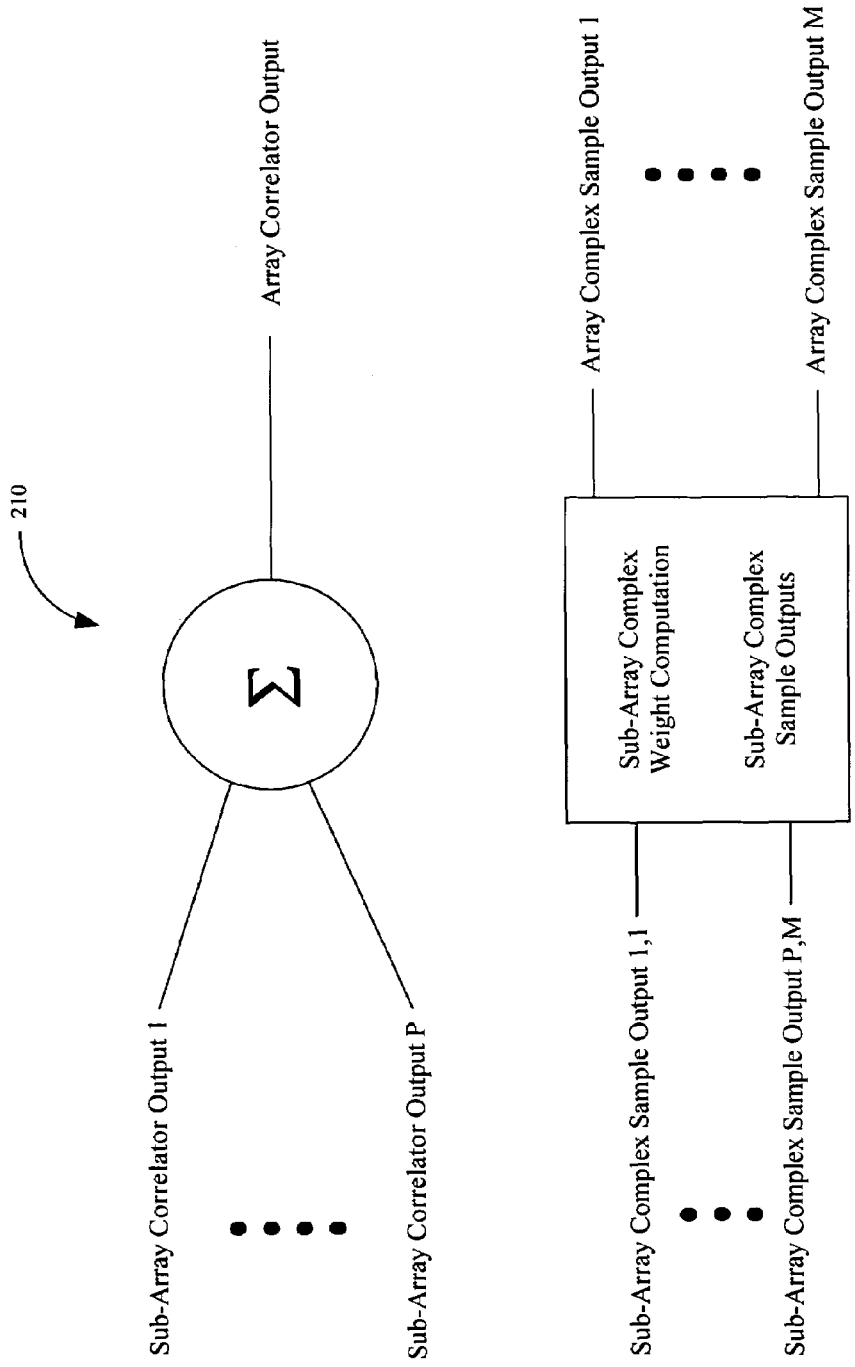
FIG. 5 is a schematic diagram illustrating the array processing unit shown in FIG. 2 in accordance with an exemplary embodiment of the present invention.

FIG. 2 is a schematic block diagram illustrating a scalable digital beamforming architecture 200 in accordance with an exemplary embodiment of the present invention. The method 100 shown in FIG. 1 may be implemented utilizing the scalable digital beamforming architecture 200. The scalable digital beamforming architecture 200 may be located on a node in an ad hoc network. The scalable digital beamforming architecture 200 may include an array processing unit 210 (see, e.g., FIG. 5), and a plurality of sub-array processing units 208 (see, e.g., FIG. 4) which are controlled by the array processing unit 210. Each of the plurality of sub-array processing units 208 may control a plurality of digital transmit/receive paths. Each of the plurality of digital transmit/receive paths may include an antenna element 202, a receiver 204, and an element processing unit 206. The element processing unit 206 may be physically located inside the associated receiver 204. The antenna element 202 may be omni-directional. The receiver 204 is communicatively coupled to the antenna element 204 and the element processing unit 206. The element processing unit 206 may include a correlator and a delay (FIG. 3).

As shown in FIGS. 2-5, each antenna element 202 is connected to an RF receiver 204 and an element processing unit 206 which performs processing at the element level. This processing is architected so that a number of antenna elements 202 (e.g., 16 antenna elements, or the like) may be connected together into a sub-array. At the sub-array level, signal correlations and sub-array processing may be collected. Algorithms may allow a variable number of sub-arrays to be combined into an array, which is capable of directivity down to a few degrees. This approach toward adaptive beamforming is a departure from the conventional approach which focuses on ideal adaptive beamforming and requires inversion of an N×N matrix where N is the number of elements. The conventional approach is difficult to scale to very large arrays.

The scalable digital beamforming architecture 200 may perform adaptive beamforming for receiving data from a node of an ad hoc large scale directional network. The scalable digital beamforming architecture 200 may utilize a signal-in-space with a robust synchronization sequence. Preferably a synchronization sequence precedes a signal (or data) during the data transmission. The correlator associated with each receiver 204 continually searches for a secure synchronization pattern directed toward the receiver 204. The outputs of these correlators are non-coherently summed to determine the presence of the synchronization pattern. Once the synchronization pattern is detected, the relative phase and magnitude of the correlators, as well as the cross correlation matrix of the background channel, allows the scalable digital beamforming architecture 200 to compute the ideal weights for each antenna element 202 to form a beam that is optimally adapted to the synchronization pattern under the current channel conditions. During the data portion of the transmission, these weights are applied to digitally "steer" the antenna elements 202 by combining the signal with an appropriate phase rotation based upon the phase differences in the synchronization reception. Because the data is digital at this point, the scalable digital beamforming architecture 200, using the delay, may compute a separate set of weights for each synchronization pattern that is detected. Thus, the scalable digital beamforming architecture 200 may support multiple simultaneous receptions from different participants at different bearing angles relative to the scalable digital beamforming architecture 200. The ability to simultaneously receive transmissions from multiple network participants ($Rx^N$) allows an ad hoc large scale directional network to reuse the Statistical Priority-based Multiple Access (SPMA) MAC layer and networking designed for the DARPA Tactical Targeting Network Technology (TTNT) waveform.

Using the present invention, the receiver gain due to spatial combining may be significant and may be dependent upon the number of the receiver and antenna elements used. With a small instantiation of 16 elements, the gain is about 12 dB. The sidelobe rejection of such a system is on the order of 25-30 dB below the signal received in the main lobe. For each signal that is received, the adaptive beamforming algorithm may automatically direct nulls toward other transmitters and jammers to null out these interferers. The present invention may improve LPI/LPD, AJ and Power/Data Rate performance of the link by an order of magnitude over an omni-directional system. The total system bandwidth may be improved by two orders of magnitude over an omni-directional system. At the same time, because the present invention does not need to track all of the participants, the number of users supported may be increased two orders of magnitude over current directional systems, from the low 10's up to the 1,000's.

The present invention may also greatly improve the communication availability in severe multipath conditions. Current directional systems have trouble in fading conditions where the direct signal path is often blocked. Under these same conditions omni-directional systems may be designed to be able to operate off the multipath scatter using some form of channel equalization technique. However, an ad hoc network using the present invention may form a beam that is optimized to the multipath conditions and direct its transmit beam to focus all of the energy along the multipath scattering paths, thus providing reliable communication even in this difficult multipath environment.

In addition, by reusing the TTNT MAC and networking, the present invention may be able to provide an ad hoc network with ingress times less than 5 seconds and extremely low data latencies. TTNT's data latency is less than 2 milliseconds at 100 nautical miles. An ad hoc network using the present invention may have slightly higher latency due to the short transponding sequence necessary to set up a data transfer. However, an ad hoc network using the present invention may have latency less than 5 milliseconds, which is 2 orders of magnitude shorter than current TDMA-based directional system. Like TTNT, the present invention may be able to adapt in less than 10 seconds to major changes in traffic flow through the network.

Furthermore, the present invention provides an affordable, scalable architecture. Digital adaptive beamforming requires that each antenna element be linked to a separate transceiver and A/D-D/A conversion block. It also requires that each receiver have processing for basic signal reception multiplication by the elements weight vector. An ad hoc network using the present invention may be able to scale between small arrays on the order of 16 antenna elements on lower value platforms and very large arrays with up to 1,000 antenna elements on larger and higher valued platforms. Moreover, each antenna element may use identical, mass-produced hardware, thus greatly reducing the cost. Thus, for example, instead of acquiring 1,000 very expensive arrays of 1,000 elements each, one million elements may be individually mass produced for 10's of dollars and laid together into an ad hoc network that varies in size based upon user requirements.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for transmitting data from a transmitter to a receiver in an ad hoc large scale directional network, comprising:
   sending a first training sequence by a transmitter in an ad hoc directional network;
   receiving said first training sequence by a receiver in said ad hoc directional network;
   determining, by said receiver, a first apparent direction from which said first training sequence is sent;
   sending a second training sequence by said receiver to said transmitter; and
   determining, by said transmitter, a second apparent direction from which said second training sequence is sent;
   wherein said first training sequence is sent in a short series of reduced power sectored transmissions until said receiver is located.

2. The method of claim 1, wherein said first training sequence is a reduced power omni-directional training sequence.

3. The method of claim 1, wherein said first training sequence is unique to said transmitter in said ad hoc directional network, and said second training sequence is unique to said receiver in said ad hoc directional network.

4. The method of claim 1, wherein said second training sequence is a directional training sequence.

5. The method of claim 1, further comprising:
   directing, by said transmitter, a signal with said first training sequence to said receiver; and
   sending, by said transmitter, said signal with said first training sequence to said receiver.

6. The method of claim 5, further comprising:
   directing said receiver to said first apparent direction to receive said signal.

7. A system for transmitting data from a transmitter to a receiver in an ad hoc large scale directional network, comprising:
   means for sending a first training sequence by a transmitter in an ad hoc directional network;

means for receiving said first training sequence by a receiver in said ad hoc directional network;

means for determining, by said receiver, a first apparent direction from which said first training sequence is sent;

means for sending a second training sequence by said receiver to said transmitter; and means for determining, by said transmitter, a second apparent direction from which said second training sequence is sent;

wherein said first training sequence is sent in a short series of reduced power sectored transmissions until said receiver is located.

8. The system of claim 7, wherein said first training sequence is a reduced power omni-directional training sequence.

9. The system of claim 8, wherein said first training sequence is unique to said transmitter in said ad hoc directional network, and said second training sequence is unique to said receiver in said ad hoc directional network.

10. The system of claim 7, wherein said second training sequence is a directional training sequence.

11. The system of claim 7, further comprising:
means for directing, by said transmitter, a signal with said first training sequence to said receiver; and
means for sending, by said transmitter, said signal with said first training sequence to said receiver.

12. The system of claim 11, further comprising:
means for directing said receiver to said first apparent direction to receive said signal.

* * * * *